Aug. 2, 1938.  G. WIGET  2,125,470
FILLING CHANGING MECHANISM FOR LOOMS
Filed March 18, 1937  10 Sheets-Sheet 1

Fig.1.

INVENTOR
Georg Wiget
BY
Redding, Greeley & O'Shea
ATTORNEYS

Aug. 2, 1938.    G. WIGET    2,125,470
FILLING CHANGING MECHANISM FOR LOOMS
Filed March 18, 1937    10 Sheets-Sheet 2

INVENTOR
Georg Wiget
BY
Redding Greeley & O'Shea
ATTORNEYS

Aug. 2, 1938.  G. WIGET  2,125,470
FILLING CHANGING MECHANISM FOR LOOMS
Filed March 18, 1937 10 Sheets-Sheet 5

INVENTOR
Georg Wiget
BY
Redding, Greeley & O'Shea
ATTORNEYS

Aug. 2, 1938.   G. WIGET   2,125,470
FILLING CHANGING MECHANISM FOR LOOMS
Filed March 18, 1937   10 Sheets-Sheet 9

INVENTOR
Georg Wiget
BY
Redding, Greeley & Snee
ATTORNEYS

Aug. 2, 1938.    G. WIGET    2,125,470
FILLING CHANGING MECHANISM FOR LOOMS
Filed March 18, 1937    10 Sheets-Sheet 10

Patented Aug. 2, 1938

2,125,470

UNITED STATES PATENT OFFICE 2,125,470

FILLING-CHANGING MECHANISM FOR LOOMS

Georg Wiget, Arbon, Switzerland, assignor to Societe Anonyme Adolphe Saurer, Arbon, Switzerland, a corporation of Switzerland Application March 18, 1937, Serial No. 131,601
In Germany March 21, 1936

22 Claims. (Cl. 139—232)

The invention is particularly concerned with mechanism for effecting in looms the transfer of bobbins from a bobbin carrier, which carries bobbins differing from one another in respect of some property of the filling thread, as, for example, in respect of the color of the thread. In looms of this general type the multi-compartment shuttle-box is so shifted by an actuating mechanism that a shuttle-box compartment having a shuttle with a bobbin wound with thread of a desired quality, as of color, is moved into operative position. As determined by the pattern of the weaving, one or another of the shuttle-box compartments is brought into the operative position, in order to continue the weaving operation with the use of a bobbin of another color or the like. As soon, however, as a bobbin is nearly exhausted of its filling thread such bobbin must be replaced by another of the same quality. Moreover, the empty places in the bobbin carrier must be supplied with full bobbins from time to time in the course of the operation.

The purpose of the invention resides in part in means for effecting the operation of bobbin changing mechanism automatically and reliably and in such manner that an exhausted bobbin of a given quality is replaced by a new bobbin of the same quality, and further in means whereby replenishment of the bobbin carrier in the course of the operation is made easily possible without risk to the attendant.

In accordance with the invention the bobbin carrier may be rotated by an actuating mechanism which operates in harmony with the motion of the shuttle-box, and a regulating device is so acted upon by such mechanism that in the case of a change of the position of the shuttle-box the turning of the bobbin carrier into a position which corresponds to the new position of the shuttle-box is prepared for, the turning of the bobbin carrier into the indicated position being effected shortly before the bobbin change. The improved mechanism has the advantage that a nearly exhausted bobbin is with certainty replaced by a full bobbin of the same quality, while at the same time the bobbin carrier is prevented from movement during the shifting of the multi-compartment shuttle-box in the course of each operation. Heretofore in mechanisms of this general character the replenishment of the empty places in the bobbin carrier with new bobbins during the operation has been difficult, and in fact has been attended with a certain amount of risk for the attendant. Since, in accordance with this invention, the bobbin carrier remains at a standstill during the pattern-forming displacement of the shuttle-box, the attendant who replenishes the bobbin carrier must pay attention to it only when a bobbin change takes place. This does not occur, as a rule, as frequently as the displacement of the shuttle-box and also takes place comparatively slowly.

With the idea of bringing the position of the bobbin carrier into correspondence with the position of the shuttle-box in a simple and reliable manner, the new mechanism includes an appropriate swinging sector which is swung into a preliminary position of preparation by means of linkage connected with the shuttle-box control mechanism, when a change of the position of the shuttle-box is made, with the controlling mechanism remaining stationary, and the oscillating sector is swung into final position from such preliminary position, shortly before the bobbin change takes place, by means of a driving member actuated by the loom gear, with the shuttle-box actuating device remaining stationary, and thereby the bobbin carrier is turned through the operating mechanism into the position which corresponds to the new position of the shuttle-box.

The drawings illustrate embodiments of the invention which serve to effect the bobbin change in the desired manner.

On the loom slay 1 (Figure 1), which oscillates as usual with a swinging motion, there is pivotally mounted on a pivot 3" a feeler 3 which serves to contact with the weft bobbins 2 which are to be replaced, such feeler being provided with two auxiliary arms 4 and 5. The auxiliary arm 4 cooperates with a lifting lever 6 pivoted on the loom slay 1. The feeler 3 is connected by the auxiliary arm 5 with a rod 7 through a pin and slot connection as at 7'. The auxiliary arm 5 and the rod 7 are, moreover, yieldingly connected by means of a tension spring 8.

Figure 1:
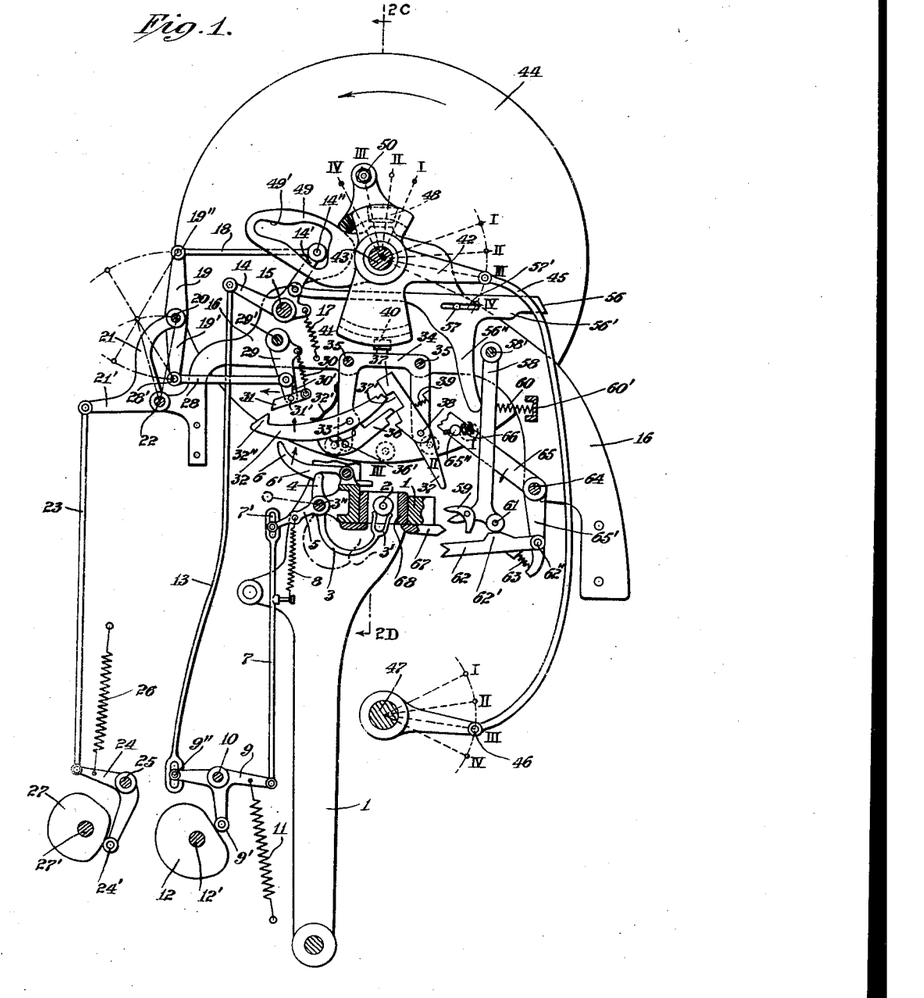
Figure 1 is an end view of the improved mechanism seen from left to right in Figure 2, showing some parts in section on the line 1A—1B of Figure 2.

Rod 7 is articulated at its other end to one of the arms of a three-armed control lever 9, which is mounted on a fixed pivot 10. Under the action of a tension spring 11 a roller 9' of the lever 9 is pressed against a cam plate 12, which is attached to a shaft 12' rotated from the loom gearing. A pin 9" of the lever 9 engages through a longitudinal slot a rod 13, which is pivotally connected at its upper end to a bell-crank 14, which is pivoted at 15 on a frame plate 16 and has connected therewith a tension spring 17, which tends to swing it in a clockwise direction (Figure 1). The arm 14' of the bell-crank 14 is connected by a link 18, as at 19", with a two-armed swinging lever 19, the pivot 20 of which, between its ends, is carried by a bell-crank lever 21. This bell-crank lever 21 is pivoted, as at 22, on the frame plate 16. A connecting rod 23, articulated to arm 21' of the bell-crank lever 21, is connected at its other end with an angular control lever 24. The latter is mounted on a fixed pivot 25 and has connected therewith a tension spring 26, which tends to press a roller 24' of the control lever 24 against a cam disk 27 on a shaft 27', operated from the loom gearing.

The lower arm 19' of the swinging lever 19 is connected by a link 28 with a lever 29, which is pivotally mounted, as at 29', on the frame plate 16. A pawl 31 is pivoted on the free end of the lever 29, as at 31'. A tension spring 30, connected to the lever 29, tends to press the pawl 31 against a stop 30' provided on lever 29.

The lever 19 is usually swung to and fro about its top pivot 19" by the actuating mechanism 27, 24, 23, 21. The pawl 31 is swung to and fro over one or another of a series of hooked levers 32 (see Figures 1, 9–11 and 13), by the lever 19, the link 28, and the lever 29. The hooked levers 32 are mounted side by side on a common pivot 33, which is supported by a sliding selector frame 34. This frame is shiftable laterally on parallel guide rods 35 mounted on the frame plate 16. One auxiliary lever 36 and one locking lever 37 are assigned to each hooked lever 32. The auxiliary levers 36 are mounted on a common pivot 36' of the frame 34. The locking levers 37 are mounted on a common pivot 38, which is likewise arranged on the frame 34. Each locking lever 37 is provided with a stepped recess 37', 37", with which the corresponding hooked lever 32 as well as the appurtenant auxiliary lever 36 cooperates as described below. Each locking lever 37 is pressed toward the appurtenant pair of levers 32, 36 by a pressure spring 39 which reacts against a stop 34' of the frame 34.

Pivoted on the top part of the shiftable sliding frame 34 there is a roller 40 (Figures 1, 12 and 13), which engages in a laterally curved cam slot 41" in the face of the end of one arm of a bell-crank lever 42. This bell-crank is mounted on the shaft 43 of the bobbin carrier 44, which is arranged on one side of the loom frame and forms a receiver and carrier for the replacement bobbins. In Figure 1 the bobbin carrier 44 is indicated by its circumferential line only. The bell-crank lever 42 is connected by a link 45 with a lever 46, which is attached to a shaft 47. Shaft 47 is turned by the shuttle-box control mechanism, so that the lever 46 is shifted into one or the other of the positions I, II, III, IV, indicated in Figure 1, according to the particular shuttle-box compartment put into the operating position by the shuttle-box, which positions correspond, for instance, to the bobbin colors, such as black, white, blue and red. The bell-crank lever 42 is shifted into one of the corresponding positions, indicated at I, II, III, IV, by its connection with the lever 46 through link 45. In accordance with the adjusted position of the bell-crank lever 42 the shiftable frame 34 coupled with it is correspondingly adjusted, so that one or another of the hooked levers 32 is placed in the plane of the pawl 31 mounted on the lever 29 as well as the plane of the supporting lever 6.

Figures 20, 21:
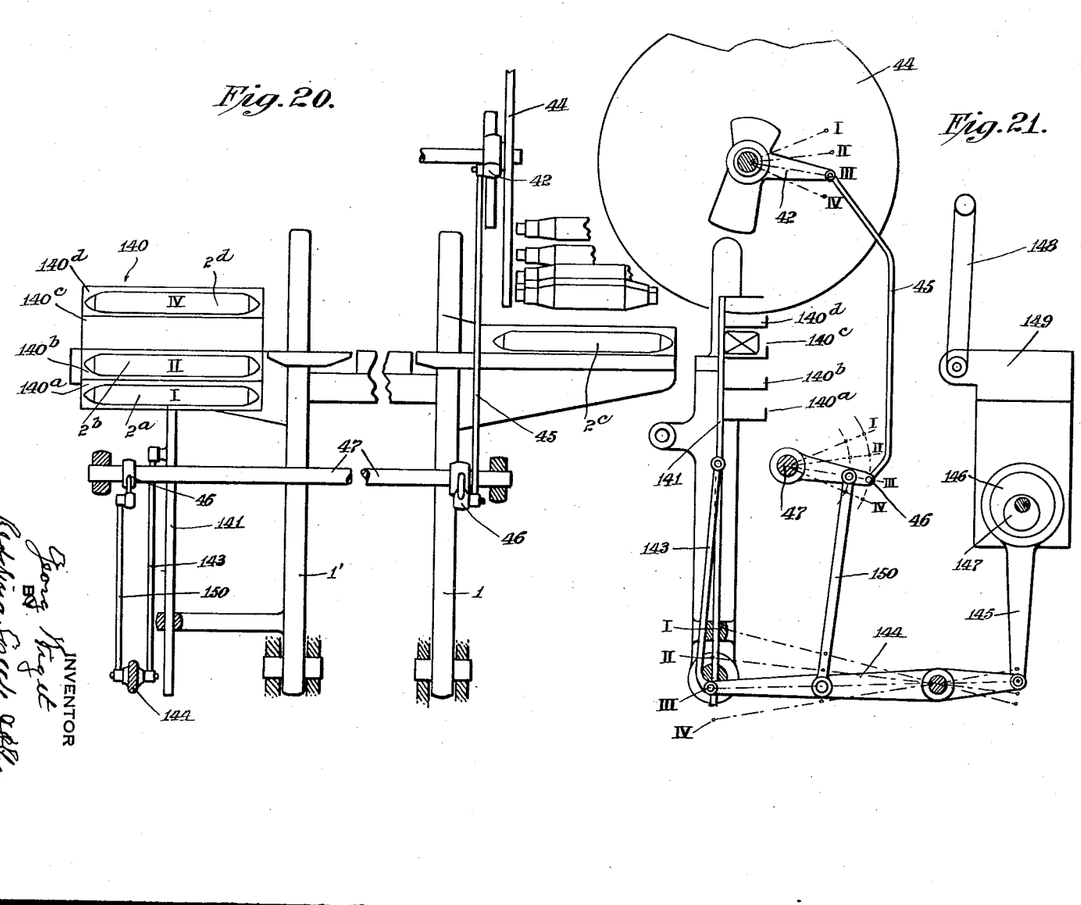
Figures 20 and 21 are detail outline views in front elevation and end elevation, respectively, of the mechanism for shifting the shuttle-box and the interconnection of the same with the mechanism with which this invention is particularly concerned.

No claim is made herein for the multi-compartment shuttle-box or its actuating mechanism, the same being of any usual or suitable construction, but that the relation thereto of the present invention may be more readily understood there is introduced here a description of a suitable construction as illustrated in Figures 20 and 21. A shuttle-box 140, having in this instance four compartments 140$^a$, 140$^b$, 140$^c$ and 140$^d$, adapted for the reception of bobbins 2$^a$, 2$^b$, 2$^c$ and 2$^d$, respectively black, white, blue and red, is mounted shiftably in a shuttle-box support and is shifted, as determined by the pattern mechanism, to place one or another of the compartments in line with the usual picker, not shown. In this construction the shuttle-box 140 is connected by a rod 143 to a lever 144 mounted on the loom frame and actuated through an arm 145 from the usual eccentrics 146, 147 which, as is also known, in such shuttle-box mechanisms are turned each through one-half of a rotation under control of the pattern card 148 through the controlling device 149 whereby the lever 144 is shifted to four different positions. In the position represented the shuttle-box has been moved to position III through the setting upward of the eccentric 146 and the setting downward of the eccentric 147. Bell crank lever 42 is positively connected by means of link 45, lever 46, shaft 47 and rod 150 with lever 144. The bobbin carrier 44 is displaced only when the shuttle control mechanism is brought into operation by reason of an exhausted bobbin. This is accomplished through the differential gearing between the levers 42, 49 and 50.

The bell-crank lever 42 is provided with a toothed gear segment 42' (Figure 2), which is in engagement with a bevel gear 48. The bevel gear 48 is mounted to turn on a radial stud 48', on a lever 49 mounted on the cylinder shaft 43. As a result, in the swinging of the lever 49, the bevel gear 48 is swung as a planet gear about the axis of the carrier shaft 43. Lever 49 is provided with a curved cam recess 49' (Figure 1), in which engages a roller 14'', which is mounted on arm 14' of the bell-crank lever 14. The bevel gear 48 is, on the other side, in engagement with a gear segment 50', formed on a lever 50 also mounted on the carrier shaft 43. The lever 50 supports a bolt 51, on which is mounted rotatably a sleeve 75. A pawl 52 (Figure 3) is secured to this sleeve by a setscrew 52'. The pawl 52 can, therefore, swing about the bolt 51 and in so doing cooperates with one of the selector disks 53, 54, 55, described below, for shifting the bobbin carrier 44 in a forward direction.

The gear segments 42, 42', 50 and 50' together with the bevel gear 48 arranged between them on the lever 49, constitute a differential gearing through which it is possible to permit the shuttle-box, which is under the control of the pattern device, to be shifted without at the same time displacing the bobbin carrier 44.

The shifting of the bobbin carrier 44 into the position corresponding to the new position of the shuttle box is effected, only shortly before the transfer of the bobbin from the carrier to the shuttle, by the lever 49, which is swung by the bell-crank lever 14 with the cooperation of the roller 14'' of the bell-crank lever on the curved surface of the cam recess 49', as will be further described.

The normal shifting step of the bobbin carrier 44, likewise to be described in detail, corresponds to the distance from bobbin to bobbin of the same quality, as from blue to blue, on the bobbin carrier and conforms to the color number of the bobbins. In the embodiment of the invention illustrated three selector disks 53, 54 and 55 are provided (Figures 2, 3), that is, for operation with two, three or four bobbin colors. The disk 53 is used, for example, when weaving with black, white, blue and red bobbins, the disk 54 when weaving with black, white and blue bobbins, and the disk 55 when weaving with black and white bobbins. The control or feeding notches (see the control notches 54' in Figure 3) are spaced at different distances apart in each of the three disks 53, 54, 55, as may be seen in Figure 4. If the operation is to be performed with three bobbin colors, for example, black, white and blue, the pawl 52 is so shifted manually on the sleeve 75 that it cooperates with the central disk 54. The pawl 52 may be adjusted, however, as desired, into the plane of another of the three disks 53, 54, 55, after releasing the set screw 52' on the sleeve 75. The disks 53, 54, 55 are interchangeably secured by bolts 43' to a hub 43'' fixed on the carrier shaft 43.

A control member 56, pivotally connected to the arm 14' of the bell-crank lever 14 (Figure 1) for controlling the so-called protector lever 58, is guided for longitudinal shifting by a longitudinal slot 57 engaging a pin 57 of the frame plate 16, and has a downward projecting arm 56''. This arm cooperates with the protector lever 58, which is pivoted at 58' on the frame plate 16, and is provided with a pair of scissor blades 59 for cutting the weft thread of the nearly exhausted weft bobbin. The protector lever 58 is acted upon by a pressure spring 60 which reacts against a stop 60' of the plate 16, the spring tending to press the protector lever 58 against the downward projecting arm 56'' of the control member 56. A roller 61 mounted on the protector lever 58 cooperates with an ejector or pusher 62. The latter is pivotally mounted at 62'' on the lower arm 65' of the transferrer 65 which may swing on a pivot 64 of the plate 16, the transferrer being provided as usual for transferring the replacement bobbins from the bobbin carrier to the shuttle. A pressure spring 63, reacting against the arm 65', tends to press the ejector or pusher 62 against the roller 61 of the protector lever 58. The transferrer 65 is provided with a laterally projecting arm 65'' (Figure 2), which carries an adjusting screw 66 (Figures 3, 11), which serves during the bobbin transfer to cooperate at that time with a locking lever 37 arranged on the sliding frame 34.

During the operation of the loom the lever 21, carrying the swinging lever 19, is itself swung to and fro in the operating cadence determined by the cam disk 27. As a rule, during this operation the lever 19 swings about its upper pivot 19'', as mentioned above. The bobbin feeler 3 is likewise swung to and fro in the operating cadence determined by the cam disk 12, which is so designed that a gentle movement of the feeler 3 is effected. When the bobbin which is about to be engaged by the feeler is almost exhausted, the feeler 3 swings toward the bobbin through such a large arc that the feeler fork grasps the almost empty bobbin, while the auxiliary arm 4 of the feeler slides over a cam nose 6' formed on the underside of the lifting lever 6. In consequence, the lifting lever 6 is swung upward from the position indicated in Figure 1, so that it impinges upon that one of the hooked levers 32, which at the time is in the path of motion of the lifting lever 6, as determined by the position of the sliding frame 34. This hooked lever 32 is then swung upward from the position shown in Figure 1 by the lifting lever 6, so that the hook 32'' of the hooked lever moves into the path of motion of the pawl 31 provided on the lever 29. In consequence, the lever 29, which the link 28 tends to move in the direction of the arrow (Figure 1), is checked and held stationary. The lever 19 swings, therefore, outward to the left about its lower pivot 28' as its fulcrum, then held by the link 28. During this operation the thrust roller 14'' of the bell-crank lever 14 bears against the curved cam surface at the right end of the cam recess 49' of the lever 49 and swings it in the corresponding direction. With the lever 49 the bevel gear 48 mounted upon it is also swung in the same direction and travels along the gear segment 42' (Figure 2) of the lever 42 which is then at rest, so that the toothed gear lever 50, with the toothed segment 50' of which the bevel gear 48 engages, is turned on its axis. In consequence, the bobbin carrier 44 is shifted by the control pawl 52, so that a bobbin 2 which has the correct color moves into the path of the transferrer 65.

The lever 46 connected with the shuttle-box control mechanism, being then in position III, as indicated in Figure 1, there is a blue bobbin in the operating shuttle. Now, if the lever 46 is swung, for example, into the position I by the operation of the shuttle-box control mechanism, in which a shuttle provided with a black bobbin is operating, the lever 42 is also swung into the position I by the link 45. During this swing of the lever 42 the lever 50, the carrier actuating pawl 52 (Figure 3), and the bobbin cylinder 44 remain at rest. The toothed segment 42' of the lever 42 now carries along the planet wheel 48 of the differential gearing, which travels along the then stationary gear segment 50' of the lever 50, so that the swinging lever 49 which carries the planet wheel 48 is moved into an intermediate position. By this operation the turning of the bobbin cylinder 44 into the new position, in which a black bobbin is presented to the transferrer 65, is prepared for.

Figure 12:
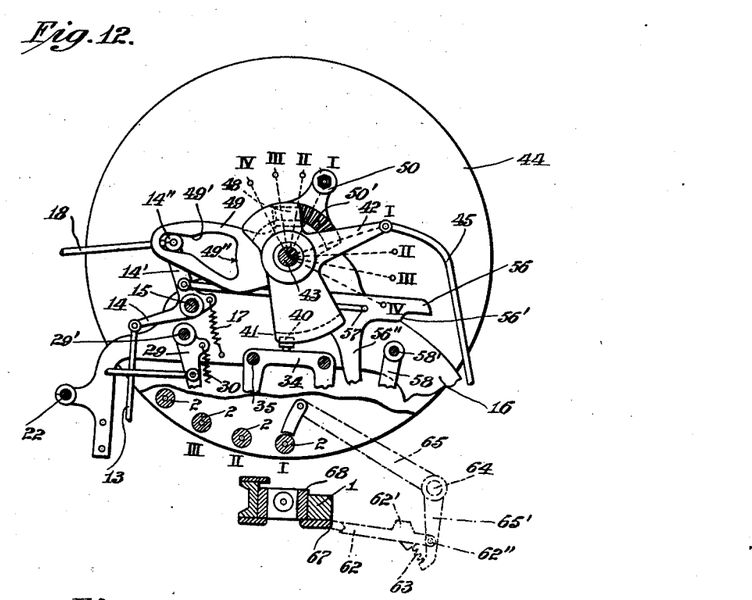
Figure 12 is a detail view of part of the mechanism shown in Figure 1 with the part of the selector mechanism and the bobbin carrier in the position shown in Figure 5.
Figure 13:
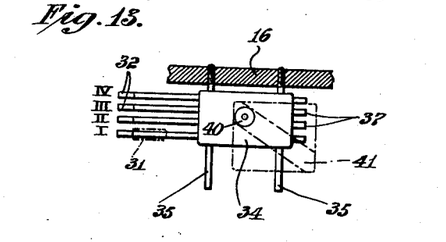
Figure 13 is a detail top view of some of the parts shown in Figure 12.

When thereupon the roller 14" of the lever 14' travels against the curved surface of the slot 49' in the manner described above, the swinging lever 49 is swung into the end position shown in Figure 12. During this swinging of the lever 49 the lever 42 is at a standstill. Accordingly, during the last mentioned swinging of the lever 49, the planet wheel 48 of the lever 50 which travels along the now stationary gear segment 42' of the lever 42 is swung into the position I (Figure 12). Accordingly also, through the coaction of the pawl 52 (Figure 3), the turning of the bobbin carrier 44 to the desired new position is completed, that is, the bobbin carrier 44 is turned so that a black bobbin comes into the path of the transferrer 65.

In the course of the above described swing of the lever 42 into the position I, the selector frame 34 is also shifted by the coaction of the cam slot 41 with the roller 40 so that the hooked lever 32 assigned to the black bobbin comes into a line with the locking pawl 31.

The swing of each hooked lever 32 (Figure 1), as described above, takes places against the action of a leaf spring 32' on the sliding selector frame 34. During the swing of the respective hook lever 32 the stop 37' of the appurtenant locking pawl 37 moves into engagement with the right end of the hook lever 32, since the locking pawl 37 is swung in the counterclockwise direction (in Figure 1) under the pressure of its spring. Through the engagement of the stop 37' with the hook lever 32 the latter lever is held stationary in the top position of its hook 32". During the swing of the locking pawl 37 in the counterclockwise direction the stop 37' also engages the right end of the auxiliary lever 36 (see Figure 10).

If now the set screw 66 of the transferrer 65, during the swing of the transferrer for the purpose of transferring a replacement bobbin, strikes the locking pawl 37, then this locking pawl is swung in the clockwise direction against the pressure of the spring 39. Consequently, the right end of the auxiliary lever 36 drops into a second stop 37" of the locking pawl (see Figure 11) under the influence of its own weight. By this means it is accomplished that during the back-swing of the transferrer 65 the locking pawl 37, which also tends to swing back under the pressure of its spring 39, is prevented from again engaging the right end of the hook lever 32 with its stop 37'.

Figure 11:
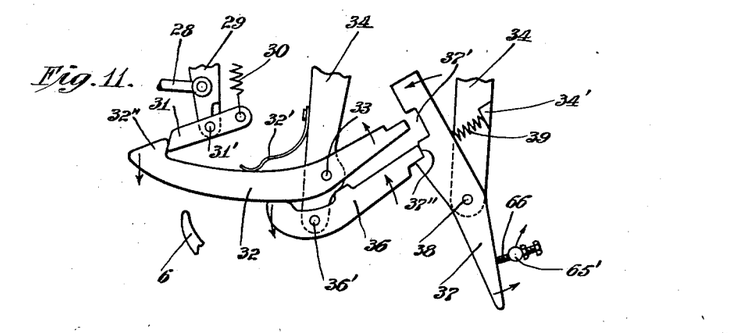

The position represented in Figure 11 is only a preliminary position which prepares for the back-swing of the hook lever 32 into the position of rest, for the nose 32" of the hook lever 32 cannot then separate from the pawl 31, because the pressure which these two parts exert upon each other and therefore the friction between the two parts is still too great to permit separation. The separation of the nose 32" from the pawl 31 and therefore the release of the swinging lever 29 occurs only if this swinging lever is swung somewhat to the right by means of the swing of the bell-crank lever 21, in the clockwise direction (Figure 1). This slight swing of the swinging lever 29 to the right is made possible by the fact that the roller 14" of the lever 14 in the outermost position of this lever to the right bears against the curved surface 49" of the lever 49, and the bell-crank lever 21 which swings further toward the right moves the lever 19 still somewhat further to the right about its top pivot 19" as its fulcrum. The hook lever 32, then, under the influence of its own weight and under the pressure of its leaf spring 32', drops in the counterclockwise direction back into the release position represented in Figure 1.

In the illustrated embodiment of the invention the arrangement of four groups of levers 36, 37, 32 on the selector frame 34 has been selected for the following reasons:

On the right side of a loom, that is, the side on which is placed the bobbin carrier, there is also disposed below it the stationary shuttle-box, while on the left side of the loom, that is, on the shuttle change-box side, there is disposed the shiftable multi-compartment shuttle-box. This multi-compartment shuttle-box is assumed, for the purposes of this description, to be located in position III, which corresponds to the position of the parts shown in Figure 1. The blue bobbin, for example, of the shuttle operating in this shuttle-box position, is assumed to have entered, with its supply of weft-thread nearly exhausted, into the shuttle-box on the bobbin carrier side. Because of the fact that the bobbin is almost exhausted, the feeler 3 swings upward from the position shown in full lines in Figure 1, so that the feeler arm 4 forces the lifting lever 6 upward and this in turn raises the hook lever 32 which is above it. As a further result the lever 29 is checked in its swinging to the left in Figure 1, through the engagement of its pawl 31 with the nose 32" of the lever 32.

During this operation, and before the bobbin transfer takes place, the shuttle is, however, again thrown toward the change-box side. Now, if precisely at this moment the pattern-forming shift of the multi-compartment shuttle-box takes place, for example to the position I, which corresponds to the position of a shuttle with a black bobbin, a shuttle with a black bobbin enters the shuttle-box on the bobbin carrier side. In this situation the lever 29, checked in its swing by the nose 32" of the hook lever 32, would effect the change of bobbins. The action of the transferrer 65 might perhaps eject the still full black bobbin, instead of the exhausted blue bobbin, had not another group of levers 32, 36, 37 been shifted at the same time with the shifting of the shuttle-box on the change-box side, of which levers the levers 32 and 36 still remain in the lowermost position as shown in Figure 1, so that the corresponding lever 29 is unchecked in its swing and no bobbin transfer can take place. By the provision of the four groups of levers 32, 36, 37 an incorrect bobbin change is prevented, that is, it is rendered impossible that, instead of an exhausted bobbin, a full bobbin of another color would be transferred.

With the object of effecting the bobbin transfer automatically, the control member 56 is shifted from the position shown in Figure 1 towards the left by the bell-crank lever 14, the roller 14" of which cooperates with the cam surface of the slot 49' of the bevel gear lever 49, and the arm 56'' releases the protector lever 58. This lever is, therefore, swung in the clockwise direction by the spring 60 in such manner that the roller 61 of the protector lever slides along from the high part 62' of the ejector 62. The stop arm is therefore swung upward by spring 63, so that it comes into the path of the lug 67 on the loom slay 1. In consequence, the transferrer 65 is swung by the loom slay 1 in the direction of the arrow indicated in Figure 1, for the purpose of transferring from the bobbin carrier 44 a replacement bobbin into the shuttle 68 carried by the loom slay 1.

The transferrer 65, during its swinging motion and through its set screw 66, acts upon the locking lever 37, which is in the locked position, as previously described, in order to start the motion to release the hook lever 32. The hook lever 32 moves out of engagement with the pawl 31 on the swing of the lever 29 toward the right (Figure 1). The lever 19 can then again be swung to and fro about the pivot 19'' by the supporting lever 21.

As the fork 3' of the feeler 3 engages the bobbin 2 in the shuttle at the same time that the transferrer 65 moves to transfer a new bobbin from the carrier, the feeler fork 3' must be moved, into the position shown by dotted lines in Figure 1, during the operation of the transferrer, so that the exhausted bobbin may be ejected from the shuttle downward without obstruction. For this purpose the lever 14, when the bobbin transfer is just beginning, acting through the rod 13, swings the actuating lever 9 for the feeler 3 away from the driving eccentric 12 against the action of the spring 11, so that the rod 7, articulated to the lever 9, presses the lever 5 upward, and in consequence the feeler arm 3 is swung with the feeler fork 3' into the position indicated by the dotted lines. In this position of the feeler fork 3' the exhausted bobbin 2 may be freely ejected downward from the shuttle.

The further shifting of the bobbin carrier 44 through one normal shifting step is effected by the shifting mechanism mentioned above, and to be further described in what follows:

A ratchet wheel 69 is fixed to the hub 43'' on the carrier shaft 43 and is secured by bolts 43' to the selector disks 53, 54, 55 (Figure 2) for the purpose of driving them. A two-armed pawl 70 (Figure 3) cooperates with this shift or control gear wheel, being pivotally mounted, as at 71, on a carrier plate 72 which is rotatable on the carrier shaft 43. A spring 73, which reacts against an abutment of the carrier plate 72, tends to keep the arm 70' of the pawl 70 in engagement with the toothed wheel 69. From time to time a roller 74, mounted on an arm 74'', secured by a set screw 74' on the sleeve 75, which is rotatable on the bolt 51, as previously stated, cooperates with the arm 70'' of the pawl 70. The pawl 52, before mentioned, is also secured to the sleeve 52.

Figure 2:
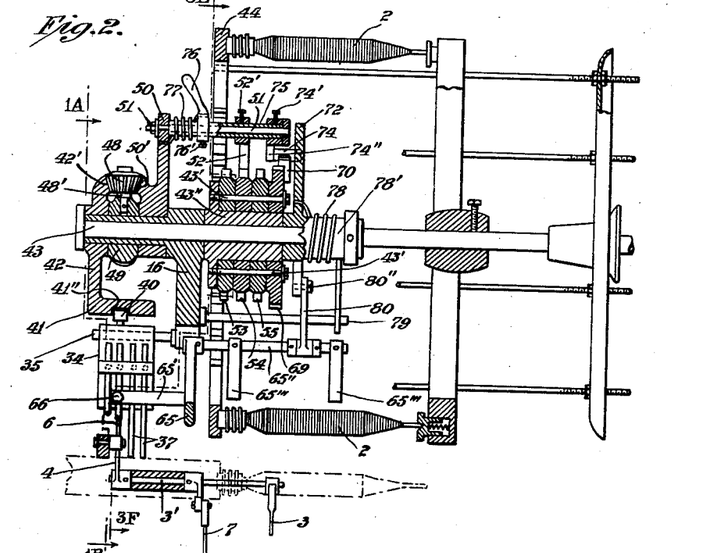
Figure 2 is a vertical longitudinal section along the line 2C—2D of Figure 1.
Figure 3:
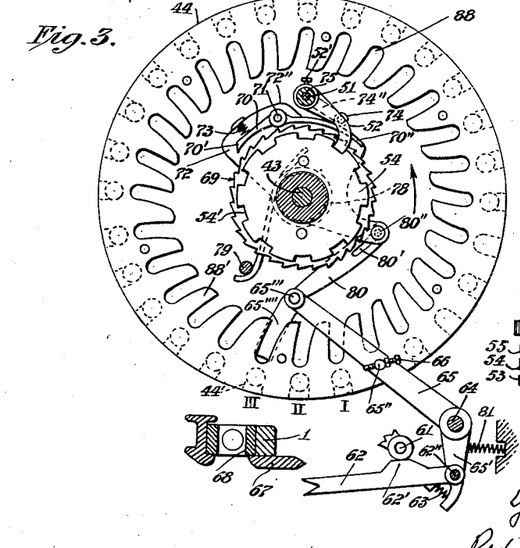
Figure 3 is a vertical cross-section on the line 3E—3F of Figure 2.
Figure 4:
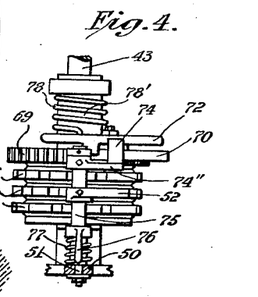
Figure 4 is a detail of Figure 3 in plan.

A hand lever 76 is secured to the sleeve 75 by a set screw 76' (Figure 2). One of the ends of a helical spring 77 is connected at one end to the hand lever 76, the other end being connected to the lever 50. The helical spring 77 tends to turn the sleeve 75 in such a manner that the roller 74 of the arm 74'' is constantly pressed against the cammed peripheral surface of the carrier plate 72 (Figures 3 and 4). A helical spring 78 is arranged on the hub 78' (Figure 2) of the carrier plate 72, one end of this spring 78 being connected to the carrier plate 72, and the other end acting against a pin 79, supported by the face plate 16. This helical spring 78 tends to turn the carrier plate 72 in the direction of the arrow (Figure 3). A pin 80'' of the carrier plate 72 is engaged with a longitudinal slot 80' of a link 80, which is connected with the transferrer 65 by a pin 65'''.

Figure 14:
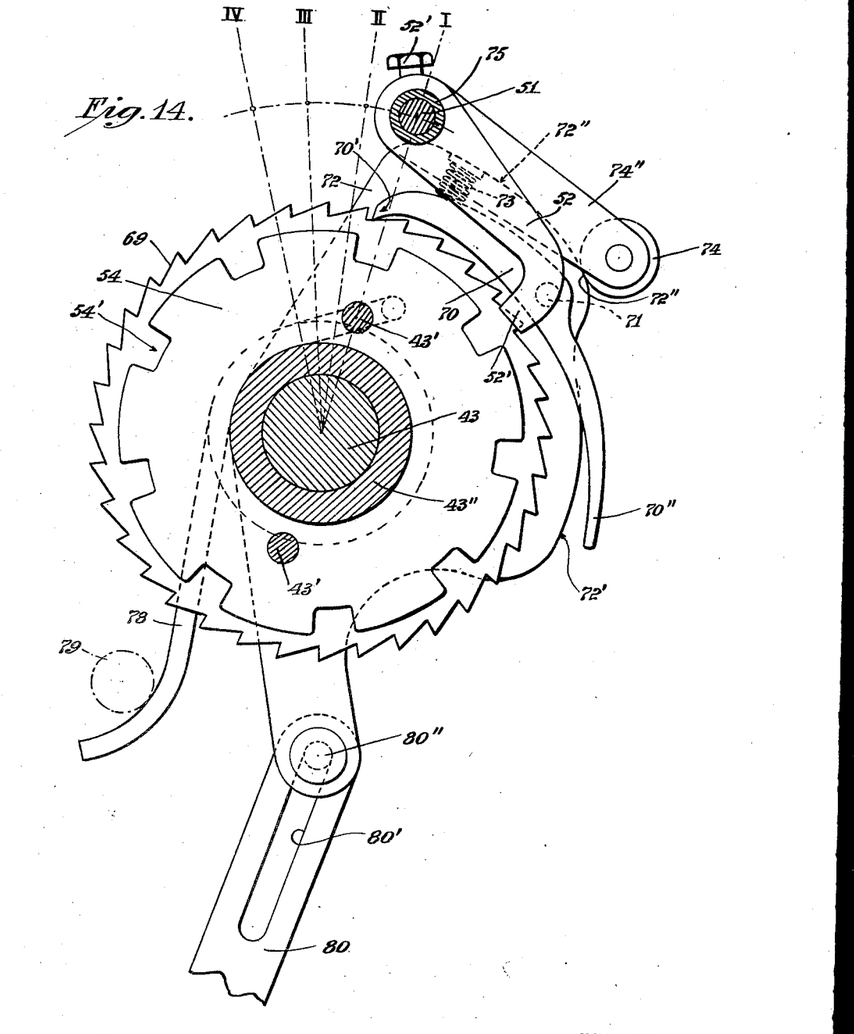
Figures 14, 15 and 16 are detail views on a larger scale of some of the parts shown in Figure 3, in three different positions.

In the swinging of the transferrer 65 from its position of rest, in which movement a replacement bobbin is transferred to the shuttle 66 in the manner described above, the carrier plate 72 is at the same time turned in a clockwise direction (Figure 3) by the link 80 and the transferrer 65 (Figure 3). Let it be assumed now that the bolt 51 is moved into the position I (Figure 14) in the manner described above, such position corresponding to the operation of the shuttle with a black bobbin. During the rotation of the carrier plate 72 in a clockwise direction, as shown in Figure 14, the roller 74 of the arm 74'' reaches the high part 72'' of the carrier plate 72. In the movement of the arm 74'', the sleeve 75 is turned on the supporting bolt 51 in such a way that the nose 52' of the pawl 52 moves out of engagement with the selector disk 54, while, on the other hand, the arm 70' of the pawl 70 is moved into engagement with the toothed gear-control wheel 69 by the spring 73 (Figure 14).

Figure 15:
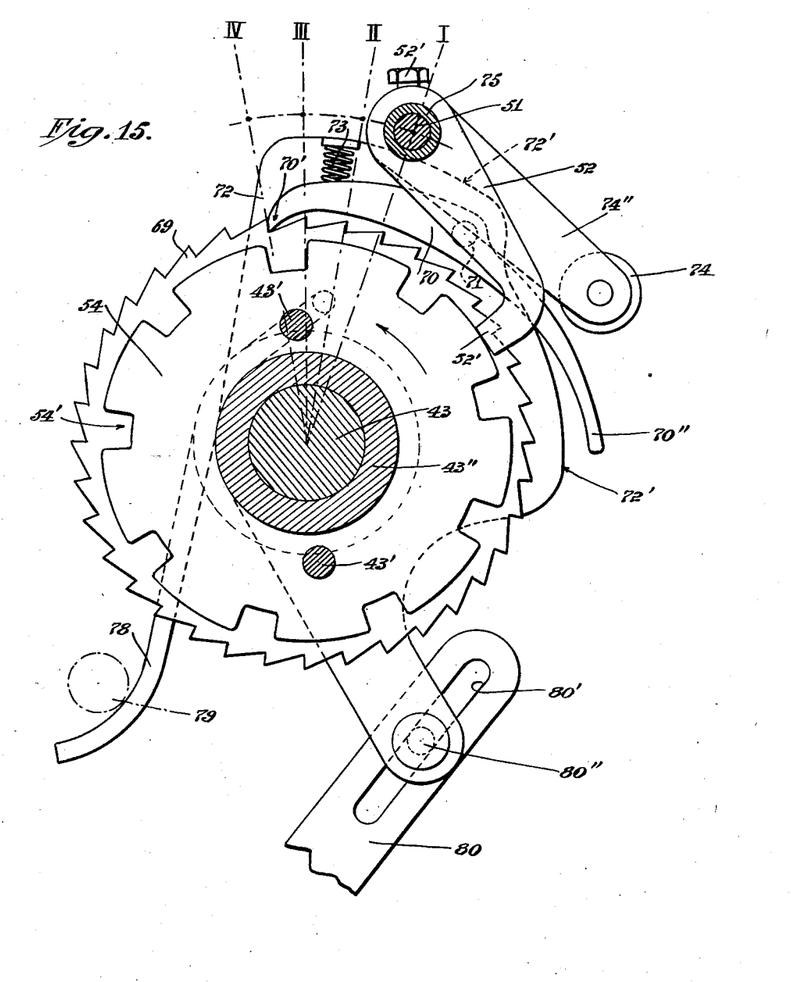
Figure 16:
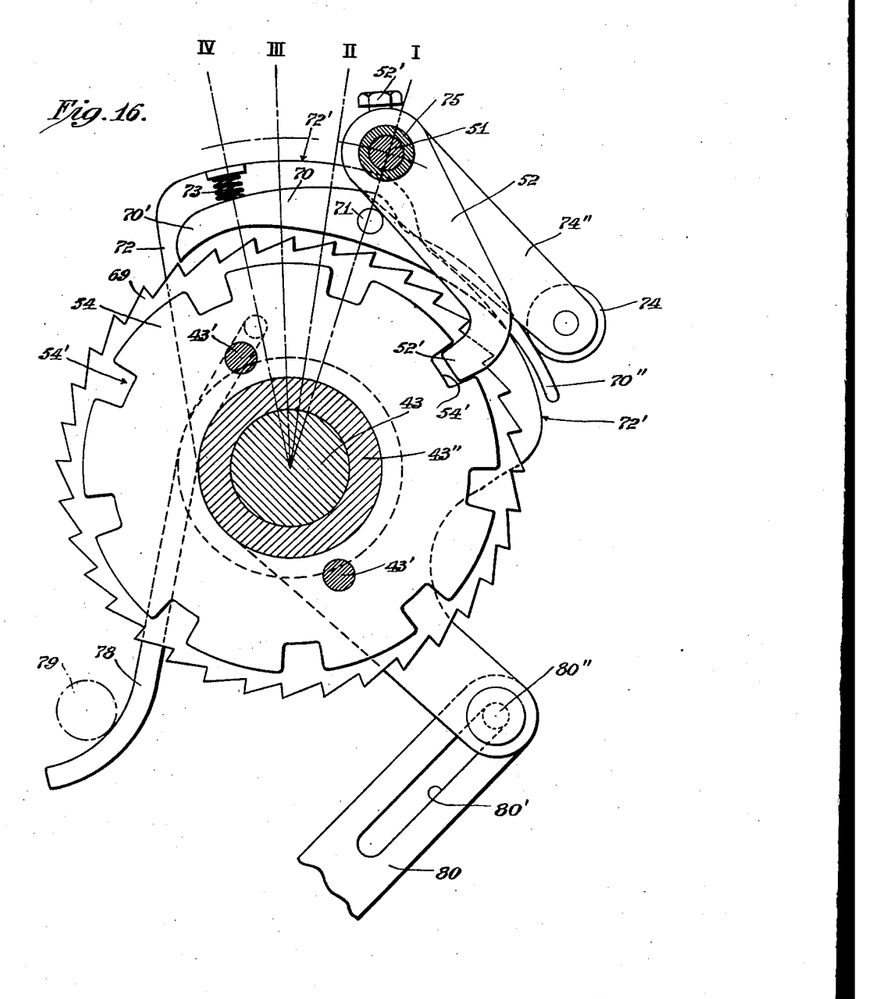

The transferrer 65 can now be returned in a clockwise direction, by the spring 81, to its position of rest, after the completion of the bobbin change (Figure 3), and, by reason of the provision of the pin and slot connection 80'', 80' (Figures 3 and 14), without thereby causing the carrier plate 72 to turn along with it. The carrier plate 72, which tends to turn the bobbin carrier 44, through the pawl 70 (Figure 14), counterclockwise remains stationary until the rod or shaft 65''' of the transferrer, on which the link 80 is pivoted and on which are fixed the pushers 65'''' by which the bobbins are ejected from the carrier, has moved out of that one of the internally directed slots 88 (Figure 3) of the bobbin carrier with which it has been engaged. As soon as the rod 65''' has moved out of engagement with such slot, the carrier plate 72 is turned by the helical spring 78 in the direction of the arrow in Figure 15. In this operation the carrier plate 72, actuated by the pawl 70, carries along the toothed gear-control wheel 69 connected with it, and in consequence also the bobbin carrier 44. As soon as the roller 74 leaves the high part 72'' of the carrier plate 72, the nose 52' of the pawl 52 reaches the periphery of the control disk 54 (see Figure 15). The control pawl 70 consequently remains in engagement with the toothed gear-control wheel 69. Only when, after further turning of the bobbin carrier 44 in the counterclockwise direction, the nose 52' of the pawl 52 drops into the next notch 54' of the control disk 54, does the roller 74 impinge upon the arm 70'' of the control pawl 70, so that this control pawl is moved out of engagement with the toothed gear-control wheel 69 (see Figure 16). The bobbin carrier 44 has now been shifted forward through the normal shifting step so that a new and full black bobbin 2 is presented to the transferrer 65.

The described operation of the control shifting of the bobbin carrier 44 is repeated with each bobbin transfer through the medium of the differential gearing 42, 48, 50 which cooperates with the control mechanism 52 and thereupon in every case the control mechanism 69, 70, in shifting the bobbin carrier 44, operates in such a way that the correct replacement bobbin is each time presented to the transferrer 65.

By means of the hand lever 76, arranged on the sleeve 75 (Figure 2) the pawl 52 can be disconnected, if necessary, so that the bobbin carrier 44 may be shifted further by hand.

Upon releasing the set screw 52' the pawl 52 may be axially shifted on the sleeve 75 and brought into engagement with another control disk 53 or 55.

Special means to be described are provided to secure the bobbin carrier 44, after each movement, in the proper position, and at the same time to prevent the striking of the rod 65''' of the transferrer 65 against the end of one of the partition members 88', formed between the slots 88 of the cylinder 44' (Figure 3), when the cylinder is in an incorrect position. During the ejection of the exhausted bobbin and the transfer of a full bobbin into the shuttle the rod 65''' of the transferrer 65 enters one or another of the slots 88 of the carrier disk 44'. In this manner the carrier 44 is held from turning during the operation of the transferrer. Moreover, a carrier locking bolt 83, loaded by a spring 83', is arranged in a fixed guide 82 (Figures 6 and 7), and with such bolt one of the arms 84' of a bell-crank lever 84 is in engagement, the second arm 84'' of the lever 84 lying in another plane (see Figure 5). A rod 85 engages the second arm 84'' of the bell-crank lever 84, the rod being movable in a fixed guide 86 and cooperating with an arm 87, which is fixedly secured to the ejector 62.

Figure 5:
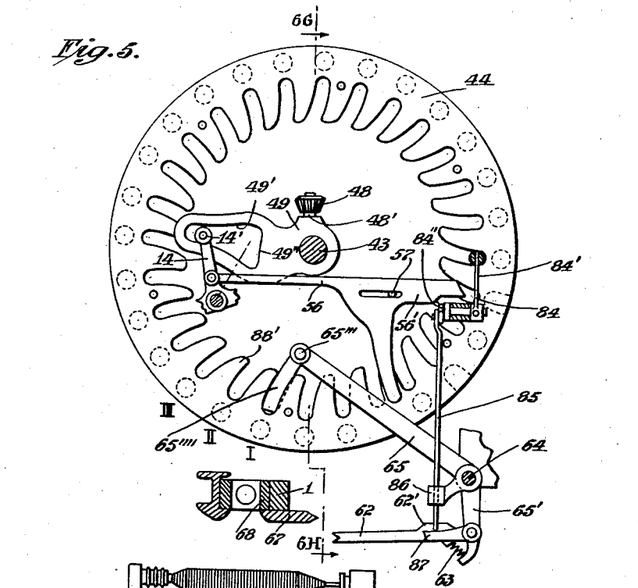
Figure 5 is a vertical section similar to Figure 3, but with some of the parts shown in Figure 3 omitted, and other parts at the left end of the mechanism shown in Figure 2 represented; in this figure the bobbin carrier is represented in a position other than that shown in Figure 3.

In the normal operation of the parts involved in the accomplishment automatically of the bobbin transfer, the control member 56 is moved to the left into the position shown in Figure 5. In this operation the protector lever 58 (Figure 1) swings in the direction of the loom slay 1. The roller 61 on the protector lever 58 moves from the cam lift 62' of the ejector or pusher 62, so that the stop arm swings upward into the path of movement of the lug 67 on the loom slay. Thereupon and thereby the transferrer 65 is actuated, provided that the bobbin carrier 44 is in proper position. In this case the safety bolt 83 (Figure 7) is pressed into the respective slot 88 of the bobbin carrier 44 by the spring 83', because the projecting part 56' (Figure 5) of the control member 56 is moved from the path of the arm 84'' of the bell-crank lever 84. The rod 85 articulated to the bell-crank lever 84, then assumes its highest position, so that the arm 87 can swing upward and the ejector or pusher 62 can take its position in the plane of movement of the lug 67 on the loom slay.

Figures 6, 7, 8:
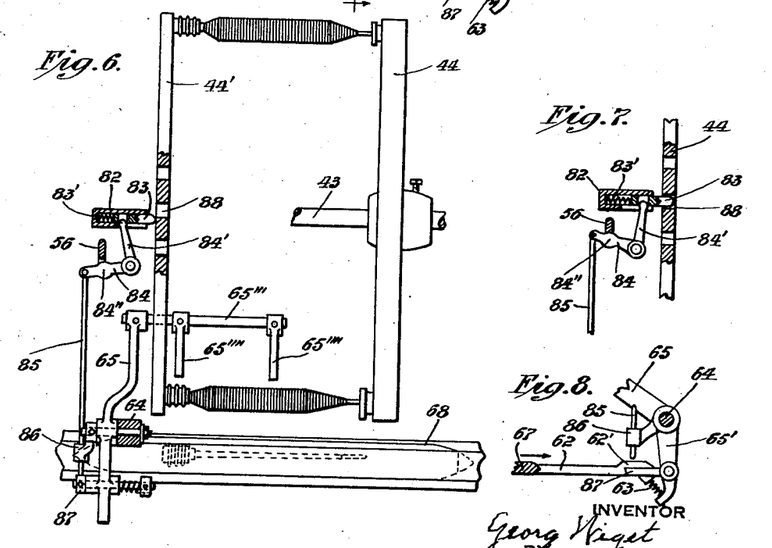
Figure 6 is a vertical longitudinal section on the line 6G—6H of Figure 5.
Figure 7 shows, with the parts in different positions, the locking mechanism shown in Figure 6.
Figure 8 is a detail view, partly in section, of devices shown at the lower part of the Figure 6, seen from left to right.
Figure 9:
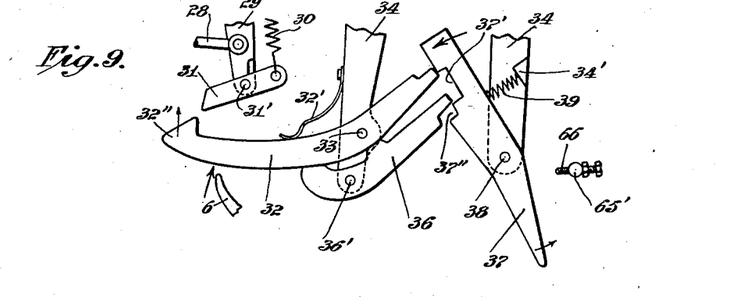
Figures 9, 10 and 11 are detail views on a larger scale of the locking mechanism shown in Figure 1 with the parts in different positions.
Figure 10:
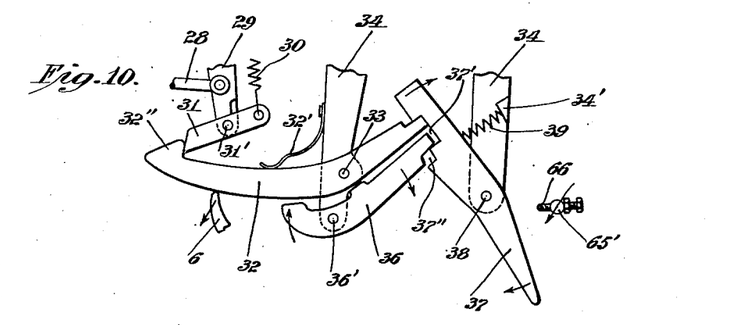

If, on the other hand, the bobbin carrier 44 is not properly adjusted, the safety bolt 83 finds no slot 88 into which to drop, and the bolt 83 bears against the bobbin carrier disk 44' (see Figure 6). The arm 84'' of the double-armed lever 84 therefore cannot rise behind the projecting part 56 of the control member 56 (Figure 6), that is, the rod 85 remains in the lower position and therefore holds the ejector 62 out of the plane of the lug 67. Thereby, the transferrer 65 is prevented from operation.

Obviously, the mechanism described above is capable of use also for automatic bobbin change in those cases in which the bobbins differ from one another in thread quality, for example, as well as in color.

The mode of operation of the above described mechanism is as follows:

Bobbins 2 with weft threads of four different colors are placed by hand in the bobbin carrier 44, always in the same relative order, as, for example, black, white, blue, red, black, white, blue, red, etc. The distance from black bobbin to black bobbin, or from white to white, or from blue to blue, or from red to red, constitutes the normal shift step of the bobbin carrier 44, which is effected by the driving pawl 70 (Figure 3). In the foregoing description it is assumed that bobbins 2 in the three colors black (I), white (II), and blue (III), are placed in the bobbin carrier 44 in the proper sequence. The shuttle-box, for example a four-compartment drop-box of usual construction and arrangement, is placed on the opposite side of the loom from the bobbin carrier 44. In this shuttle-box are placed the shuttles with bobbins of the three colors mentioned, one a shuttle with black, another with white, and the third with blue. In the position of the parts shown in Figure 1 it is to be assumed that the loom has been operating with blue bobbins. Now if, for instance, the weaving is to be continued with a black bobbin, the drop-box is brought into such position, as required by the pattern, that the shuttle with black bobbin moves into the operative position. In this positioning of the shuttle-box the lever 42 of the differential gearing is swung into position I (see Figure 12) with the aid of lever 46 (Figure 1). In this operation the shiftable frame 34 is positioned by coaction of the cam slot 41 and the roller 40, so that the corresponding hook lever 32 is placed in line with the pawl 31 and with the lifting lever 6. Furthermore, during the swing of the lever 42 into position I, the lever 49, provided with the cam recess 49', is swung into the position described above, with the aid of the differential gearing 42', 48, 50'. By the swing of the lever 49 into that intermediate position, as well as by the shifting of the sliding frame 34, the forward turning of the bobbin carrier 44, into such a position that a black bobbin 2 is presented to the transferrer 65, is prepared for but not effected. The actual shifting movement of the carrier 44 by the pawl 52 takes place with the coaction of the roller 14'' under the control of the actuating mechanism 24, 27, shortly before the bobbin change is accomplished. The shifting of the sliding selector frame 34 is intended, as already indicated, to bring into line with the pawl 31 that one of the four hook levers 32, which corresponds to the color of the shuttle which is ready for operation.

If it be now assumed that the black bobbin 2 of the operating shuttle is almost exhausted and that the shuttle with the almost exhausted bobbin is thrown to the bobbin carrier side of the loom where the weft feeler 3 is located, it will be seen that since the black bobbin is almost exhausted, the feeler 3 swings in a counterclockwise direction beyond the position shown in full line in Figure 1, so that the arm 4 of the feeler presses upward the arm 6 and that the latter in turn lifts the hook lever 32 which has been brought into line with it. Thereby, the nose 32'' of the hook lever is brought into the path of motion of the pawl 31 on the lever 29, so that the swing of the lever 29 in the direction of the arrow (Figure 1) is prevented. The lever 19, actuated by the eccentric disk 27, is therefore swung toward the left (Figure 1) about the pivot 28' carried by link 28.

By this operation also the bell-crank lever 14 connected with the lever 19 by the link 18 is swung in a counterclockwise direction (Figure 1).

The swinging of the bell-crank 14 starts substantially three operations. The feeler 3 is first swung into the lower position shown by the dotted line in Figure 1, through the intermediation of the linkage 7, 9, 13, so that the ejection of the exhausted bobbin or feeler does not prevent the entrance of the black replacement bobbin. In the second place, the lever 49 is caused to swing by the coaction of the roller 14" with the curved surface of the recess 49'. The bevel gear 48 rolls along the toothed segment 42' (Figure 2) of the lever 42 and turns the lever 50 on its axis. When this turning of the lever 50 is completed the shifting of the bobbin carrier 44 into such a position that a black bobbin is presented to the transferrer 65, that is, with the turning of the lever 50 the pivot pin 51 (Figure 3) is so swung that the bobbin carrier 44 is turned into the stated position through the agency of the pawl 52 which engages the control disk 54. In the third place, the control member 56 is shifted forward to the left in Figure 1 through the swinging of the bell-crank lever 14 in a counterclockwise direction (Figure 1). The arm 56" of the control member therefore frees the lever 58, so that this lever swings to the left in Figure 1 and the roller 61 slides off the cam lift 62'. The ejector 62 therefore swings upward and reaches such a position that the lug 67 of the slay 1, which swings to the right in Figure 1, meets it. Thereby the transferrer 65 is caused to swing in the direction of the arrow and the black replacement bobbin is transferred from the carrier to the shuttle. The exhausted bobbin is ejected from the shuttle on insertion of the replacement bobbin and drops down out of the way.

The set screw 66 of the swinging transferrer 65 acts against the locking lever 37 (Figures 1, 9, 10, 11), so that the release of the hook lever 32 is prepared for as described above. The final release of the lever 32 occurs as soon as the lever 29 swings to the right. The lever 29 is swung to the right in all operating positions by the control mechanism 26, 27, even when the hook lever 32 is in its upper position. In the extreme position of the lever 29 to the right the pawl 31 moves out of contact with the nose 32" of the hook lever 32, so that this hook lever can be turned counterclockwise (Figure 1) by its own weight and the spring 32' so as to return to its position of rest.

As already described, the bobbin carrier 44 is shifted forward, by engagement of the pawl 70 with the control wheel 69 (Figure 3), through one normal shifting step after operation of the transferrer 65, so that the next black bobbin is brought into the position of preparation for removal from the carrier in the next operation of the transferrer.

If in the continued operation of the loom, at the next operation of the transferrer 65, a black bobbin is again to be inserted, the differential gearing 42, 49, 50 does not function in the intermediate time between the two operations of the transferrer, but the bobbin carrier 44 is advanced through a normal shifting step only, by means of the driving pawl 70 (Figure 3). If, however, in such intermediate time interval, in place of a black bobbin, a white or blue bobbin is placed in operative position by the action of the shuttle-box mechanism, an additional shifting step is imparted to the bobbin carrier with the aid of the differential gearing 42, 49, 50, as described above, so as to present a white or blue bobbin to the transferrer 65.

Figure 17:
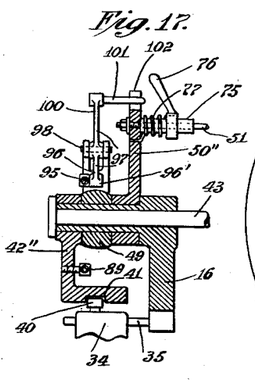
Figure 17 is a detail view, partly in section, of a modification of the devices shown at the upper left end of Figure 2.
Figure 18:
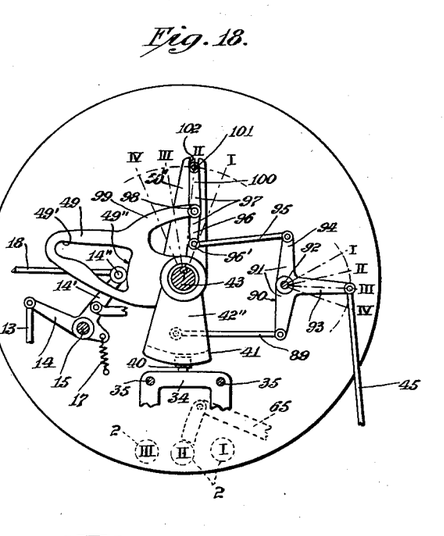
Figures 18 and 19 are detail views similar to the upper part of Figure 1, but showing the modification also shown in Figure 17, with parts in different positions.
Figure 19:
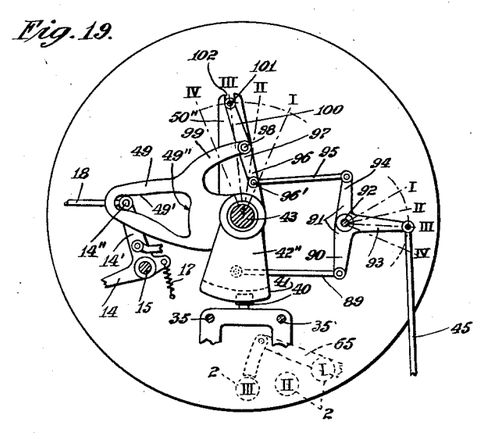

In the embodiment of the invention presented in Figures 17-19 the shifting of the bobbin carrier 44 into the position which corresponds to the color of the bobbin in the operating shuttle is effected by a swinging lever mechanism, instead of the above described differential gearing.

In Figures 17-19 the parts which are shown also in Figures 1-16, are identified by the same reference numerals and require no further explanation. Rotatable on the shaft 43 (Figure 17) there are again two levers 42", 50" between which the lever 49 may swing. The levers 42", 49, 50" in Figure 17 have the same significance as the parts 42, 49, 50 in Figure 2. In the embodiment shown in Figures 17-19, however, the lever 42" is connected by means of a link 89 with the arm 90 of a three-armed lever 91, which is mounted on a fixed pivot 92. The rod 45, described above and connected with the shuttle-box control mechanism, is linked to the arm 93 of the swinging lever 91. The arm 94 of the swinging lever 91 is connected by a link 95 with the arm 96 of a two-armed lever 97. This lever 97 may be swung on its pivot by a connection at 98 with an arm 99 of the above described lever 49. The arm 100 of the lever 97 is provided with a lateral pivot pin 101 (Figure 17), which engages a radial slot 102 provided in the upper end of the lever 50".

The three-armed lever 91 is shifted into one of the positions I, II, III or IV mentioned above, by the shuttle-box control mechanism. The lever 42" is therefore swung in a corresponding manner and with positive action, and in consequence the selector frame 34 is shifted as described, through the coaction of the cam groove 41 and the roller 40 as before.

If it be assumed that the lever 50" is in position II, which corresponds to the operation of a shuttle with a white bobbin and if it be assumed also that the lever 91 is swung, for example, from the position II into the position III shown in Figure 18, which corresponds to the operation of a shuttle with a blue bobbin, only the lever 49 provided with the cam recess 49' is swung into an intermediate position by means of the swinging lever 97, for the pivot 101 in the arm 100 of the swinging lever 97 is held stationary in the slot 102 of the lever 50" which is at this time at rest. Shortly before the occurrence of a bobbin change, the swinging lever 49 is swung into the end position, indicated by Figure 19, by the roller 14" of the lever 14, as described above. As the lower pivot 96' of the swinging lever 97 is at this time retained by the shuttle-box control mechanism, the bobbin carrier 44 is turned into the position III with the swinging of the lever 49 into the position shown in Figure 19 by the aid of the lever 97 which now swings about the pivot 96', of the lever 50" and the above described shifting or control pawl 52 (Figure 3), in which position there is a blue bobbin 2 in the path of the transferrer 65.

It will be understood that various changes in construction and arrangement can be made without departing from the spirit of the invention and that the invention therefore is not limited to the particular construction and arrangement herein described and claimed except as pointed out in the accompanying claims.

It is also to be understood that while in some of the accompanying claims certain of the parts named are identified by reference numerals in brackets, such reference numerals are employed only by way of illustration and for the purpose of enabling the general purport of the claims to be more readily understood and not with any intention of restricting such claims to combinations of elements which include the specific elements so identified and shown in the drawings.

I claim as my invention:

1. In filling-changing mechanism for looms, the combination of a loom slay, a bobbin carrier, a bobbin feeler (3) for contact with the bobbin pivotally mounted on the slay and arranged to swing on its pivot, the feeler having an arm (4), a lifting lever (6) also pivoted on the slay, and arranged to be raised by the arm of the feeler, a hooked lever (32) pivoted on the loom frame above the lifting lever, a lever (29) pivotally supported on the loom frame and adapted to be engaged by the hooked lever and checked in motion, a two armed swinging lever (19), a supporting lever (21) on which the swinging lever is pivoted at a point between its ends and connected at one end to the first named lever (29), means to actuate the supporting lever (21), a control lever (14) connected to the other end of the swinging lever (19), a protector lever, a transferrer, means actuated by the protector lever to permit or prevent operation of the transferrer, and means (56) intermediate the control lever and the protector lever whereby the protector lever is shifted to release the transferrer for operation.

2. In filling-changing mechanism for looms, the combination of a shiftable multi-compartment shuttle-box, means for shifting the shuttle-box to position one or another of the compartments, a rotatable bobbin carrier adapted to receive a plurality of sets of bobbins of different qualities arranged in the same order, a selector mechanism in operative relation with the shuttle-box mechanism, said selector mechanism comprising a set of selector units corresponding respectively with the compartments of the shuttle box and connected to the carrier, means to drive the carrier, control mechanism for controlling the operation of said last named means, and connections between the selector mechanism and the control mechanism whereby the latter is actuated from the former.

3. A filling-changing mechanism for looms as described in claim 2, and in which there are included a lever (49) in the selector mechanism, connections (42, 45, 46, 47) between the shuttle-box mechanism and said lever (49) by which the lever is swung into a position of preparation, and an actuating member (14) operated from the loom gearing by which said lever (49) is swung to a final position when the shuttle-box is at rest.

4. A filling-changing mechanism for looms as described in claim 2, and in which there are included a control mechanism (50, 51, 52) through which the carrier is shifted in harmony with the movement of the shuttle-box, a ratchet wheel (60) mounted with the bobbin carrier, a pawl carrier (72) mounted loosely on the shaft of the bobbin carrier, a pawl (70) for engagement with the ratchet wheel (69), a transferrer, and means whereby the pawl carrier is actuated by the transferrer.

5. A filling-changing mechanism for looms as described in claim 2, and in which there are included a control mechanism (50, 51) through which the carrier is shifted in harmony with the movement of the shuttle-box, a ratchet wheel (60) mounted with the bobbin carrier, a pawl carrier (72) mounted loosely on the shaft of the bobbin carrier, a pawl (70) for engagement with the ratchet wheel (69), a transferrer, and means whereby the pawl carrier is actuated by the transferrer, said means including a link (80) having a pin and slot connection (80', 80'') with the pawl carrier (72).

6. In filling-changing mechanism for looms, the combination of a shiftable multi-compartment shuttle-box, means for shifting the shuttle-box to position one or another of the compartments and place one or another of the shuttles in position for operation, a rotatable bobbin carrier adapted to receive a plurality of sets of bobbins of different qualities arranged in the same order, a notched driving gear connected to the carrier, a pawl (52) to coact with said notched gear, operating connections between the shuttle box and the pawl (52) to actuate the pawl, a ratchet wheel connected to the carrier, a second pawl (70) to coact with the ratchet wheel, a transferrer to transfer the bobbins from the carrier to the shuttles, and means actuated by the transferrer to actuate the second pawl (70).

7. In filling-changing mechanism for looms, the combination of a shiftable multi-compartment shuttle-box, means for shifting the shuttle-box to position one or another of the compartments and place one or another of the shuttles in position for operation, a rotatable bobbin carrier adapted to receive a plurality of sets of bobbins of different qualities arranged in the same order, a plurality of notched selector disks having the notches differently spaced, a driving pawl (52), the selector disks being shiftable to place one or another in operative relation with the pawl (52), intermediate means whereby the selector disks are shifted in harmony with the position of the shuttle-box, a ratchet wheel secured to the shaft of the carrier, a second pawl (70) in operative relation with the ratchet wheel, and means to actuate the second pawl whereby at each operation the carrier is advanced through the same degree of angular motion.

8. In filling-changing mechanism for looms, the combination of a shiftable multi-compartment shuttle-box, means for shifting the shuttle-box to position one or another of the compartments and place one or another of the shuttles in position for operation, a rotatable bobbin carrier adapted to receive a plurality of sets of bobbins of different qualities arranged in the same order, a plurality of notched selector disks having the notches differently spaced, a sliding selector frame, an actuating pawl adapted for engagement with one or another of said disks, a plurality of hooked levers (32), a swinging lever (29) adapted to be engaged by one or another of the hooked levers, an intermediate lever (19) operatively connected at one end to the swinging lever (29), a supporting lever (21) in which the intermediate lever (19) is pivotally mounted between its ends, means actuated from the loom gearing to oscillate the supporting lever (21) and thereby to change the position of the intermediate lever, a bell-crank lever (14), a connection (18) from the other end of the intermediate lever (19) to one arm of the bell-crank lever (14), a slay, a bobbin feeler pivoted on the slay, means actuated by the movement of the feeler as it engages a nearly exhausted bobbin to move the hooked lever (32) into the path of motion of the swinging lever (29), and linkage connection between the feeler and the bell-crank lever.

9. A filling-changing mechanism for looms as described in claim 8 and in which are included a cam disk (12) driven from the loom gearing, a spring pressed lever (9) in operative relation with the disk, a link connection (7) between the lever (9) and the feeler, and a link connection between the last named lever (9) and the bell-crank lever (14).

10. In filling-changing mechanism for looms, the combination of a shiftable multi-compartment shuttle-box, mechanism for shifting the shuttle-box to position one or another of the compartments and place one or another of the shuttles in position for operation, a rotatable bobbin carrier adapted to receive a plurality of bobbins, means whereby the carrier is rotated step by step in harmony with the movement of the shuttle-box to place a selected bobbin in position for transfer from the carrier to a shuttle, a lever (50), means to oscillate the lever (50) in harmony with the shuttle-box mechanism, a bolt (51) carried by the lever 50), a sleeve (75) mounted rotatably on the bolt (51), a pawl (52) carried by the sleeve, a notched disk (53, 54, 55) secured with the carrier and adapted to be engaged by the pawl (52), an arm (74'') carried by the sleeve, a second pawl (70), a transferrer for transferring the bobbins from the carrier to the shuttles, means whereby the second pawl (70) is oscillated by the transferrer, a ratchet wheel (69) secured with the carrier and adapted to be engaged by the second pawl (70), and means whereby the engagement or disengagement of the second pawl (70) with or from the ratchet wheel is controlled by the arm (74'').

11. In a filling-changing mechanism for looms, the combination of a slay having a pusher (67), a feeler (3) pivotally mounted on the slay and adapted to swing on its pivot when permitted by the nearly exhausted bobbin, the feeler having an arm 5, a lever (14), means to actuate said lever (14), a control member (56) operatively connected to said lever (14), a protective lever (58) in operative relation with the control lever (56), a bobbin carrier (44), a transferrer to transfer bobbins from the carrier to the shuttles, a cammed stop lever (62) pivoted on the transferrer and adapted to stand in line with the pusher and to be moved out of line by the movement of the protector lever, and operative connections (7, 9, 13) between the feeler and the first mentioned lever (14) whereby the control member (56) is permitted to move to release the stop arm (62) only when the feeler is permitted to swing by a nearly exhausted bobbin.

12. A filling-changing mechanism for looms as described in claim 11 and in which there are included a locking bolt (83) to engage the carrier and hold it from movement, means (84, 85) to operate the bolt, and operative connections (85, 87) between said means (84, 85) and the stop arm (62) whereby the stop arm can be moved into line with the pusher only when the bolt is engaged with the carrier.

13. In a filling-changing mechanism for looms, the combination of a shiftable multi-compartment shuttle-box, mechanism for shifting the shuttle-box to position one or another of the compartments, a rotatable bobbin carrier to receive a plurality of bobbins of different qualities, a segmental gear (42, 42'), and operative connection (45) between said segmental gear and the shuttle-box mechanism, a second segmental gear (50, 51'), a lever (49) mounted between the two segmental gears, a planet gear (48) mounted on the lever (49) and in engagement with both of the segmental gears, means to control the movement of said lever (49), and driving means (51, 52, 54) intermediate the second gear segment (50) and the carrier.

14. In a filling-changing mechanism for looms, the combination of a shiftable multi-compartment shuttle-box, mechanism for shifting the shuttle-box to position one or another of the compartments, a rotatable bobbin carrier to receive a plurality of bobbins of different qualities, a lever (49) mounted on the shaft of the carrier, an operative connection (45, 89, 90) between said lever (49) and the shuttle-box mechanism, a two-armed lever (97) mounted on said lever (49), a connection between one (96) of the arms of said lever (49) and the two-armed lever (97), a lever (50'') and operative connections between the last named lever (50'') and the carrier, and an operative connection (100, 101, 102) between the other arm of the two-armed lever (97) and the last named lever (50'').

15. A filling-changing mechanism for looms as described in claim 14 and in which the connection between the last named lever (50'') and the two armed lever (97) is a pin and slot.

16 In filling-changing mechanism for looms, the combination of a shiftable multi-compartment shuttle-box, mechanism for shifting the shuttle-box to position one or another of the compartments and one or another of the shuttles in position for operation, a rotatable bobbin carrier arranged to receive a plurality of bobbins of different qualities, means whereby the carrier is rotated step by step in harmony with the movement of the shuttle-box to place a selected bobbin in position for transfer from the carrier to a shuttle, a transferrer for transferring the bobbins from the carrier to the shuttles, means to actuate the transferrer, and a control mechanism cooperating with the first mentioned means to position the bobbin carrier before the actuation of the transferrer, such control mechanism comprising a lever (49), connections between the shuttle-box shifting mechanism and the lever to move the lever into a preliminary position of preparation, means to move said lever into final position while the last mentioned mechanism is at rest, and operating connections between said lever and the carrier whereby the carrier is positioned.

17. In filling-changing mechanism for looms, the combination of a shiftable multi-compartment shuttle-box, mechanism for shifting the shuttle-box to position one or another of the compartments and place one or another of the shuttles in position for operation, a rotatable bobbin carrier adapted to receive a plurality of sets of bobbins of different qualities arranged in the same order, a selector mechanism comprising a plurality of selector disks, a single shiftable actuating means for the disks, and operating connections between the shuttle-box mechanism and said actuating means to shift the actuating means into engagement with one or another of the selector disks, means whereby the selector mechanism is operated from the shuttle-box mechanism, and means whereby motion is transmitted from each of the selector disks to the carrier.

18. A filling-changing mechanism for looms as described in claim 2, and in which there are included a lever (49) in the selector mechanism, connections (42, 45, 46, 47) between the shuttle-box mechanism and said lever (49) by which the lever is swung into a position of preparation, an actuating lever (14) operated from the loom gearing by which said lever (49) is swung to a final position when the shuttle-box is at rest, and in which there are also included a lever (19), a link connection (18) between the lever (19) and the lever (14), a supporting lever (21) on which the lever (19) is pivoted, and means (23, 24, 27) by which the lever (21) is actuated from the loom gearing.

19. A filling-changing mechanism for looms as described in claim 2, and in which there are included a lever (49) in the selector mechanism, connections (42, 45, 46, 47) between the shuttle-box mechanism and said lever (49) by which the lever is swung into a position of preparation, an actuating lever (14) operated from the loom gearing by which said lever (49) is swung to a final position when the shuttle-box is at rest, and in which there are also included a lever (19) pivoted at a point between its ends, a link connection (18) between one end of the lever (19) and the lever (14) and in which there are included a supporting lever (21) on which the lever (19) is pivoted, a lever (29), a link connection (28) between the other end of the lever (19) and the lever (29), and means to check the movement of the lever (29) to swing on its connection with the link (28) as a fulcrum.

20. A filling-changing mechanism for looms as described in claim 2, and in which there are included a lever (49) in the selector mechanism, connections (42, 45, 46, 47) between the shuttle-box mechanism and said lever (49) by which the lever is swung into a position of preparation, an actuating lever (14) operated from the loom gearing by which said lever (49) is swung to a final position when the shuttle-box is at rest, and in which there are included a lever (19) pivoted at a point between its ends, a link connection (18) between one end of the lever (19) and the lever (14), a supporting lever (21) on which the lever (19) is pivoted, a lever (29), a link connection (28) between the one end of the lever (49) and the lever (19), and means to check the movement of the lever (19) and compel the lever (19) to swing on its connection with the link (28) as a fulcrum, said means comprising a hooked lever (32), a bobbin feeler (3), means actuated by the feeler (3) to raise the hooked lever (32) into the path of the lever (29).

21. A filling-changing mechanism for looms as described in claim 2, and in which there are included a lever (49) in the selector mechanism, connections (42, 45, 46, 47) between the shuttle-box mechanism and said lever (49) by which the lever is swung into a position of preparation, an actuating lever (14) operated from the loom gearing by which said lever (49) is swung to a final position when the shuttle-box is at rest, and in which there are included a lever (19) pivoted at a point between its ends, a link connection (18) between one end of the lever (19) and the lever (14), a supporting lever (21) on which the lever (19) is pivoted, a lever (29), a link connection (28) between the other end of the lever (19) and the lever (29), means to check the movement of the lever (29) and compel the lever (19) to swing on its connection with the link (28) as a fulcrum, said means comprising a hooked lever (32), a bobbin feeler (3), means actuated by the feeler (3) to raise the hooked lever (32) into the path of the lever (29), a locking lever (37) adapted to engage the hooked lever (32) and retain it in raised position, a transferrer for transferring the bobbin from the carrier to the shuttle, and means whereby the transferrer in its movement disengages the locking lever (37) from the hooked lever.

22. A filling-changing mechanism for looms as described in claim 2, and in which there are included a lever (49) in the selector mechanism, connections (42, 45, 46, 47) between the shuttle-box mechanism and said lever (49) by which the lever is swung into a position of preparation, an actuating lever (14) operated from the loom gearing by which said lever (49) is swung to a final position when the shuttle-box is at rest, and in which there are included a lever (19), a link connection (18) between the lever (19) and the lever (14), a supporting lever on which the lever (19) is pivoted, and means (23, 24, 27) by which the lever (21) is actuated from the loom gearing, and in which the lever (49) has a cam surfaced recess (49') and the lever (14) is provided with a roller (14") which coacts with the cammed recess (49').

GEORG WIGET.